(12) United States Patent
Wobben

(10) Patent No.: US 6,361,275 B1
(45) Date of Patent: *Mar. 26, 2002

(54) WIND ENERGY INSTALLATION

(76) Inventor: Aloys Wobben, Argestrasse 19, 26607 Aurich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,522
(22) PCT Filed: Jun. 30, 1998
(86) PCT No.: PCT/EP98/03776
§ 371 Date: Jan. 25, 2000
§ 102(e) Date: Jan. 25, 2000
(87) PCT Pub. No.: WO99/05414
PCT Pub. Date: Feb. 4, 1999

(30) Foreign Application Priority Data

Jul. 25, 1997 (DE) .......................... 197 31 918

(51) Int. Cl.$^7$ .............................................. F04D 29/18
(52) U.S. Cl. ........................................ 416/33; 416/31
(58) Field of Search ............................. 416/31, 33, 43, 416/44, 25

(56) References Cited

U.S. PATENT DOCUMENTS

| 4,297,076 A | 10/1981 | Donham et al. |
| 4,339,666 A | 7/1982 | Patrick et al. |
| 4,348,155 A | 9/1982 | Barnes et al. |
| 4,355,955 A | 10/1982 | Kisovec |
| 4,550,259 A | 10/1985 | Bartels |
| 5,019,006 A | * 5/1991 | Schneider et al. ............. 416/43 |
| 5,655,878 A | * 8/1997 | Yamakawa et al. ........... 416/31 |

FOREIGN PATENT DOCUMENTS

| DE | 25 46 884 | 4/1977 |
| GB | 2 067 247 | 7/1981 |

* cited by examiner

*Primary Examiner*—John Kwon
(74) *Attorney, Agent, or Firm*—Reed Smith LLP

(57) ABSTRACT

A wind power installation is disclosed comprising a rotor having at least one rotor blade for converting the kinetic energy of the wind into mechanical energy, an adjusting device for individually adjusting at least one rotor blade, a generator for converting the mechanical energy of the rotor into electrical energy, and an operative connection between the rotor and the generator for transmitting the mechanical energy of the rotor to the generator. The disclosed wind power installation therefore avoids specified problems of known installations and provides a wind power installation in which the loadings which can occur due to local, temporary peaks in the wind speed in portions of the rotor area are reduced. Accordingly, in the disclosed wind power installation, there is provided a measuring device which ascertains the instantaneous loading of a part of the wind power installation, a control device which ascertains a position of at least one rotor blade that is desired for the instantaneous loading, and suitably adjust the rotor blade by the adjusting device, and a connecting device which connects the adjusting device and the measuring device to the control device.

27 Claims, 3 Drawing Sheets

WIND ENERGY INSTALLATION

BACKGROUND OF THE INVENTION a) Field of the Invention

The invention concerns a wind power installation comprising a rotor with at least one rotor blade for converting the kinetic energy of the wind into mechanical energy, an adjusting device for individual adjustment of at least one rotor blade, a generator for converting the mechanical energy of the rotor into electrical energy, and an operative connection between the rotor and the generator for transmitting the mechanical energy of the rotor to the generator.

b) Description of the Related Art

Wind power installations of that kind are part of the state of the art. Thus for example the German reference book 'Windkraftanlagen' by Erich Hau, Springer-Verlag, 2nd edition, 1996, pages 52, 175, 222 to 242, 269 and 320 shows wind power installations of that kind. In those known wind power installations, the speed of rotor rotation and the power output can be regulated by means of a regulating system for the angle of incidence of the rotor blade. In addition the known system for regulating the rotor blade angle of incidence serves to protect the rotor from rotating at an excessive speed in the event of high wind speeds or in the event of a mains failure in which the generator torque abruptly disappears. Both cases involve protecting the wind power installation from damage due to a rotor rotating at an excessively high speed.

In that respect there are essentially two ways of producing a reduction in the speed of rotor rotation, by means of rotor blade adjustment; on the one hand the blade setting angle can be reduced in the direction of smaller aerodynamic angles of incidence in order thereby to reduce the power consumption of he rotor. On the other hand, it is possible to achieve the critical aerodynamic angle of incidence, the so-called stall condition, by adjusting the rotor blade setting angle to larger angles. The latter option affords the advantage of adjustment in a shorter distance, but it entails the disadvantage that flow break-down (stall) is related to high loadings for the rotor and the entire wind power installation. A common aspect of both adjustment options however, is that they only take account of a mean wind speed acting on the entire wind power installation, or a certain limit speed of rotor rotation, as the starting signal for setting the rotor blade angle.

A known wind power installation is installed in GB-A-2 067 247. In accordance with that publication, the wind power is measured in the plane of the rotor of wind power installations by means of pressure probes which are disposed at the surface of the rotor blades in the proximity of the profile nose. In that publication, the measurement values ascertained in that way are used inter alia to pivot the rotor plane of a wind power installation until the measurement values are the same for a rotor position of 90° and 270°.

A further known wind power installation is known from U.S. Pat. No. 4,297,076. The wind turbine disclosed here is a stall-controlled machine. The main rotor blades of that known installation are fixedly connected to the hub and are not rotatable on their longitudinal axis. The main loads in the main shaft of the installation are produced by the non-rotatable components of the rotor blades.

The above mentioned options in the state of the art do not take account of the fact that, particularly when a large rotor diameter is involved, there can be a non-uniform distribution of the wind conditions over the area of the rotor. That in turn results in different loadings on individual rotor blades as well as asymmetrical loadings for the drive train of the wind power installation, that is to say the hub, the drive shaft and the respective bearings. Different asymmetrical loadings of that kind, however do not only occur just as from a given speed of rotor rotation or a given wind speed, but also take place continuously during normal operation of the wind power installation. The blade angle regulation known hitherto from the state of the art cannot therefore react to fluctuations in wind speed and fluctuations in load, which are related thereto, in the region of the rotor, as the known installations provide for uniform, synchronous adjustment of the rotor blades.

In more modern installations (see in particular page 238 of the above-mentioned reference book), on the one hand, individual electrical adjustment of each individual rotor blade has admittedly been proposed; however that proposal is also based on the assumption of a mean wind speed acting on the wind power installation. With that and the further assumption that the wind speed increases with height, the proposal is then for a fixed, rotationally cyclical correction of the rotor blade incidence angle in order to be able to at least partially regulate out the changing loads upon the increase in wind speed with height. That rotor blade setting procedure also suffers from the disadvantage that the angle of incidence of the rotor blades is fixedly predetermined and therefore cannot react to local, temporary changes in the wind speed over a part of the rotor. With this proposal also therefore, there is an asymmetrical loading on the components of the wind power installation, which thus reduces the service life thereof, in the case of local peaks in the wind speed as viewed over the area of the rotor.

OBJECT AND SUMMARY OF THE INVENTION

Primary object of the invention is therefore that of avoiding the above-mentioned problems and providing a wind power installation which reduces the loadings which can occur by virtue of local, temporary peaks in the wind speed in portions of the rotor area.

In accordance with the invention, that object is attained in that, in a wind power installation of the kind set forth in the opening part of this specification, there are provided measuring means for ascertaining the instantaneous loading of a part of the wind power installation, control means for ascertaining a position of at least one rotor blade, wanted for the instantaneous loading, and for suitably adjusting the rotor blade by means of the adjusting device, and connecting means connecting the adjusting device and the measuring means to the control means.

The wind power installation according to the invention makes it possible, by means of the adjusting device for individual adjustment of at least one rotor blade, for the wind power installation to be matched by means of the control means to instantaneous loadings which occur locally only at a part of the wind power installation, such loadings being ascertained by the measuring means. This advantageously provides that local peaks in the loading on the rotor blades, the hub, the shaft drive and the bearings used are avoided. That in turn has the consequence that the service life of the wind power installation is increased or is not unintentionally reduced as asymmetrical loadings of parts of the wind power installation, which are such as to reduce the service life thereof, are substantially avoided.

In addition, the wind power installation according to the invention permits optimum use to be made of the instantaneous distribution of the wind speeds on the rotor area and thus makes it possible to contribute to an increased power output from the wind power installation as all rotor blades are always operated with the desired and thus optimum blade angle and therefore the level of efficiency per rotor blade rises in comparison within the efficiency of the wind power installations in the state of the art.

It is particularly preferred for the position of the rotor blade or blades to be uninterruptedly adapted to the instantaneous loading of the wind power installation. In that way it is possible to ensure that the wind power installation is continually operated in the optimum working range and at the same time is protected from loading peaks, triggered due to wind speed peaks which occur locally in the region of the rotor.

In a preferred embodiment of the invention the measuring means for ascertaining the local loading on a rotor blade ascertain a wind speed which obtains at the rotor blade. For that purpose the measuring means preferably have an anemometer mounted on the rotor blade. By virtue of the fact that the anemometer is arranged directly on the rotor blade, it is possible to achieve highly accurate control of the angular positioning of the rotor blade, as a reaction to an increased or lower wind speed. For, measurement of the wind speed directly at the location at which adjustment of the wind power installation also occurs, namely directly at the rotor blade to be adjusted, permits rapid accurate adaptation of the angular position of the rotor blade to local variations in the wind speed.

A further preferred embodiment is distinguished in that the measuring means ascertain a mechanical load which prevails in a portion of the region of the rotor. In this embodiment, direct ascertainment of the mechanical loading occurring in a portion of the rotor provides the control means with precise information, by means of which the control means can ascertain a desired position of at least one adjustable rotor blade, having regard to the predetermined data in respect of geometry, load and/or material.

It is particularly advantageous in this embodiment if the measuring means ascertain a mechanical load which prevails in the adjustable rotor blade. For, by the load being ascertained directly in the rotor blade, very precise information about the wind strength profile over the area of the rotor can be obtained, in a similar manner to the above-discussed procedure for directly ascertaining the wind speed at the rotor blade. With such precise information, the control means are then capable of controlling a particularly accurate reaction on the part of the adjusting device so that an existing load peak in a portion of the rotor can be very rapidly reduced.

A further embodiment of the invention with a rotor hub for carrying the rotor blades has measuring means which measure a mechanical load occurring in the rotor hub. This embodiment also permits rapid adaptation of the rotor blades to the altered load situation. The same applies for embodiments with a stub shaft or spindle portion for supporting the rotor, in which the measuring means ascertain a load prevailing in the stub shaft, and in the case of a wind power installation having a drive shaft which connects the rotor and the generator together directly or by way of a transmission, wherein the measuring means ascertain a load which prevails in the drive shaft or in the bearings of the drive shaft or the stub shaft or spindle portion. All the above-mentioned embodiments permit accurate detection of the local load conditions in the region of the rotor and thus accurate control of the adjusting device by means of the control means. In that respect it is particularly preferred if the measuring means, for measuring the mechanical load, have strain gauges which are mounted on the respective loaded parts of the wind power installation. That means that the strain gauges can be mounted on the rotor blade, in the interior of the rotor blade, on the rotor hub or in the interior of the rotor hub, on the stub shaft or in the interior of the stub shaft, on the drive shaft or in the interior of the drive shaft, or at the bearings. In all the above-indicated different manners of mounting the strain gauges, it is possible easily to determine the mechanical loading involved and thus individually adjust the rotor blade in accordance with the invention.

A further preferred embodiment of the invention has measuring means which ascertain an afflux angle of the wind, which prevails at the rotor blade to be adjusted. By virtue thereof it is advantageously possible also to determine the wind direction of the afflux flow of wind relative to the rotor blade to be adjusted. By means of that measurement value, the control means can also react to a change in wind direction which occurs in a portion of the rotor.

Particularly in conjunction with the above-mentioned load-measuring means, the control means have a very accurate picture about the instantaneous wind conditions over the area of the rotor: by virtue of the load-measuring means the control means can take account of an absolutely occurring load and in addition by virtue of the measuring means for determining the afflux angle—having regard to the actual rotor blade position—it is also possible to provide for accurate determination of the magnitude of the angle to be adjusted. Accurate adaptation with wind conditions which change quickly is thus advantageously ensured by the combined use of afflux angle measurement and load measurement in the rotor blades. In that respect it is particularly preferred for measurement of the afflux angle to be effected by a wind vane or indicator mounted on the rotor blade.

A further preferred embodiment of the invention is distinguished in that a portion of a rotor blade is adjustable asynchronously relative to at least one further adjustable portion of another rotor blade. Thus, particularly when dealing with large rotor diameters, it is possible to reduce the level of apparatus structure and expenditure insofar as preferably the outer portion of the rotor blade is adapted to be adjustable, as power generation of the rotor is substantially concentrated on the outer blade region.

In an advantageous embodiment of the invention, the position of the rotor blade or blades, which is desired for a given instantaneous loading, can be predetermined by way of input means connected to the control means. In that way the wind power installation according to the invention can be adapted on site after erection to possibly unforeseen wind conditions or after repair to modified material sizes or modified rotor blade profiles.

It has been found particularly advantageous for the actual value of the rotor blade angular position to be detected by an adjusting transmission which, together with an adjusting motor, forms the adjusting device. In that respect, it is particularly advantageous if the control means effect adjustment of the rotor blade practically simultaneously with detection of the measurement values from the strain gauges, the anemometer or the wind vane or indicator, after comparison with the actual value of the adjusting drive, by means of the adjusting motor. Such an instantaneous reaction to changes in loading in the region of the rotor blades ensures that harmful loadings or one-sided loadings on the rotor are effectively avoided.

An advantageous process for the adaptation of a wind power installation to instantaneous loadings which prevail only in a local portion of the wind power installation is distinguished in that the instantaneous loading of a part of the wind power installation is detected by measuring means and a position of at least one of the rotor blades, which is desired for the instantaneous loading, is ascertained by control means, and that the rotor blade is suitably adjusted by means of the adjusting device, wherein the adjusting device and the measuring means are connected to the control means by way of connecting means. That simple process makes it possible to achieve an effective increase in the service life and efficiency of the wind power installation according to the invention.

Further advantageous configurations of the invention are set forth in the appendant claims.

BRIEF DESCRIPTION OF THE DRAWINGS

An embodiment of the invention will now be described with reference to the accompanying drawings in which.

DESCRIPTION OF THE PREFERRED EMBODIMENTS

Figure 1:
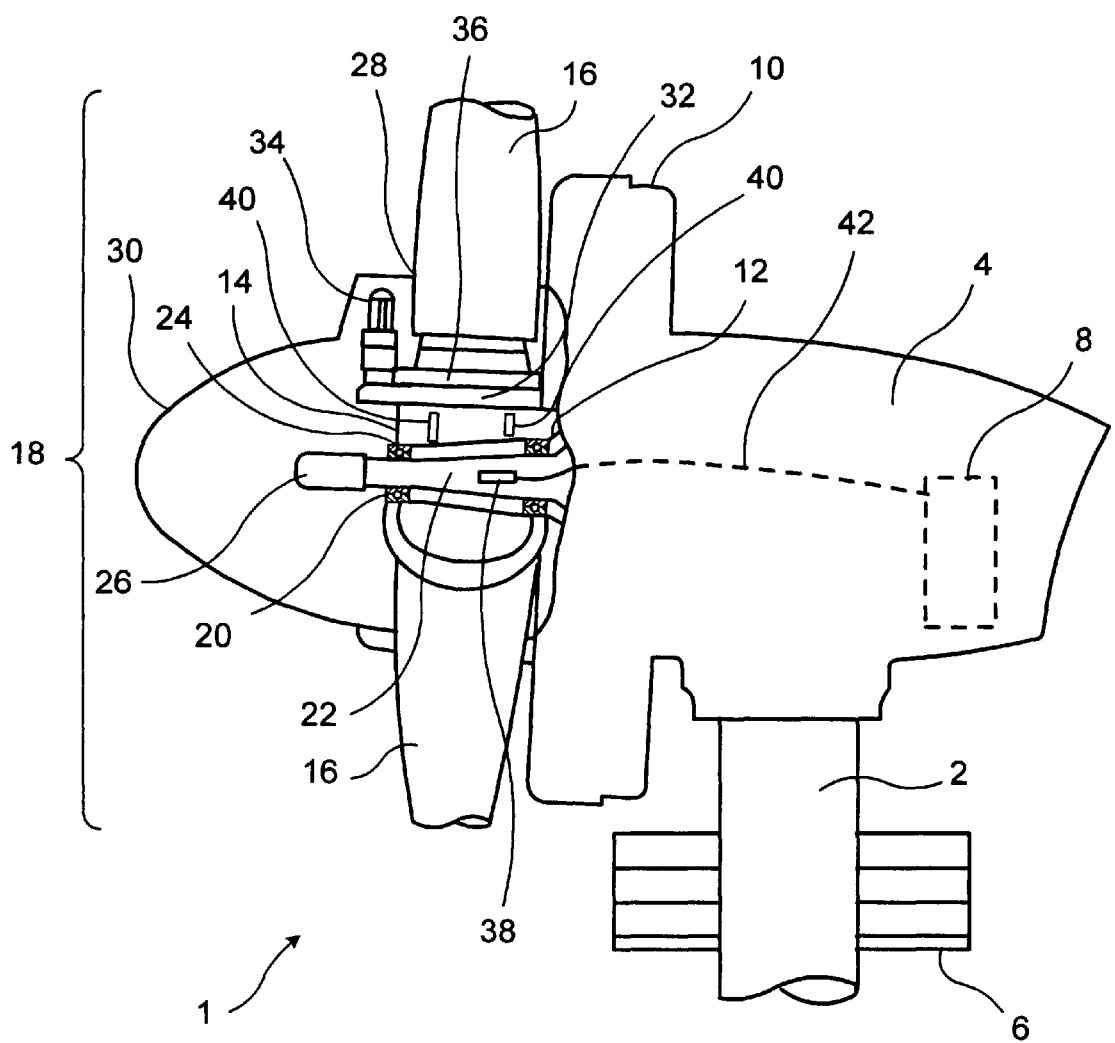
FIG. 1 is a partial section through a wind power installation according to the invention.

FIG. 1 shows a view in partial section of a wind power installation 1. The wind power installation 1 is supported on a tower 2 of which only part is shown. A housing 4 is fitted on to the tower 2 at the upper end thereof. A maintenance platform 6 which is mounted on the tower is disposed beneath the housing 4. In its rear part which is closed in the drawing and which is shown at the right therein, the housing 4 has a generator (not shown) and a control device 8 shown in broken line. The generator is disposed behind an outwardly extended bulge portion 10 of the housing 4 and is flange-mounted by its generator rotor member (not shown) to the rotor hub 14 by way of connecting elements 12. The rotor hub 14 and the rotor blades 16 (only partially shown) together form the rotor 18 of the installation. The rotor 18 is supported with its rotor hub 14 by way of bearings 20 on a stub shaft or spindle portion 22. The stub shaft 22 projects through the rotor hub 14, extending through an opening 24 which is provided in the rotor hub 14. At its end towards the tower 2, the stub shaft 22 is connected to the tower 2, within the housing 4. From the tower 2 which is to be substantially vertically erected, the stub shaft 22 projects in a position of being tilted slightly upwardly with respect to the horizontal. The stub shaft 22 is connected to the stator (not shown) of the generator and projects through the rotor member of the generator and through the opening 24 in the rotor hub 14 and, after extending out of the opening 24, on the side of the rotor 18 which is remote from the tower 2, it is closed off by a closure portion 26.

The rotor blades 16 in turn extend outwardly in perpendicular relationship to the axis of the stub shaft 22. In that arrangement the rotor blades 16 pass through openings 28 in the front housing 30. The front housing 30 is connected movably with respect to the housing 4 that is fixedly connected to the tower 2, and it is fixedly connected to the hub 14.

Figure 3:
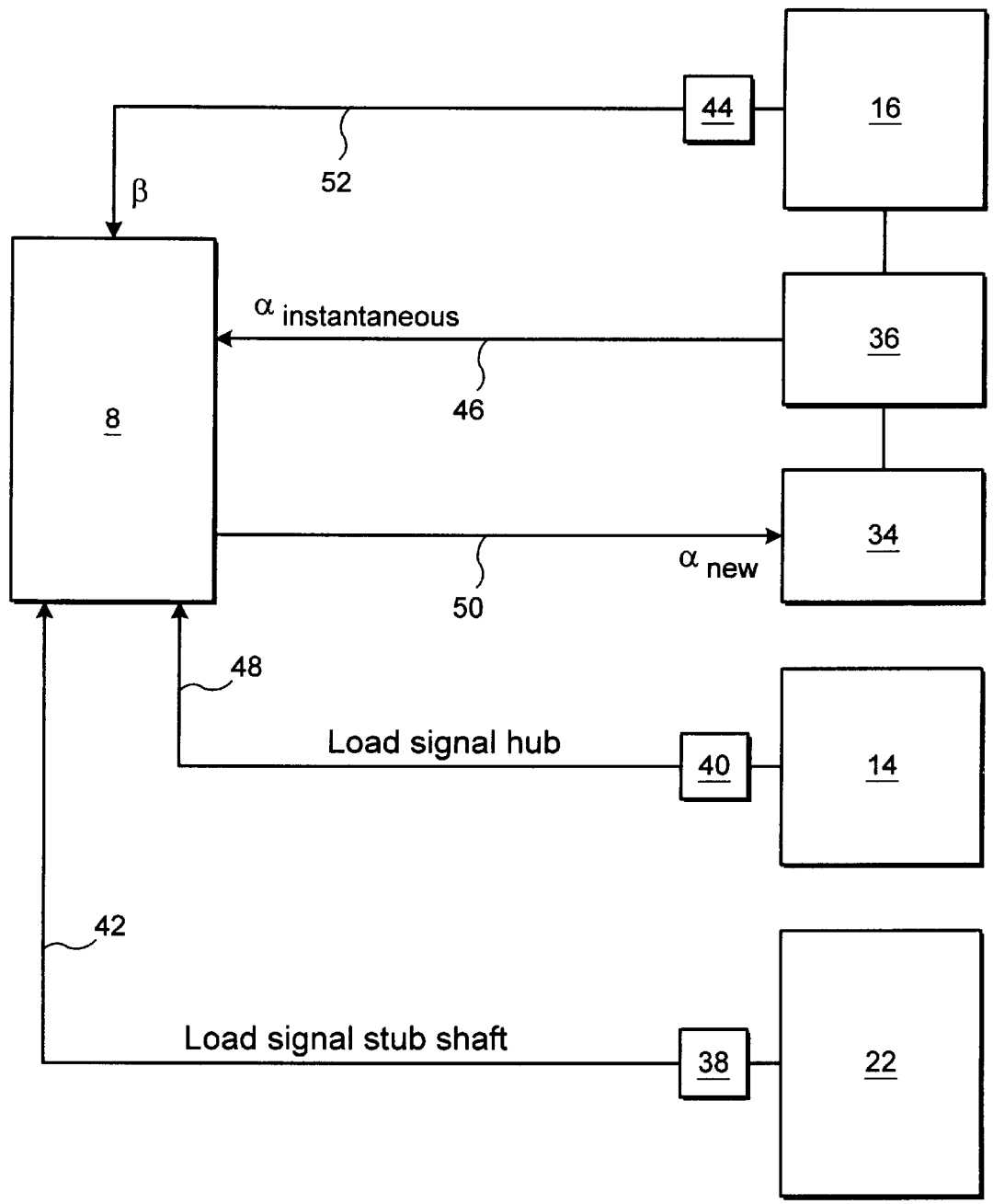
FIG. 3 is a block circuit diagram representing control of the adjustable rotor blade in a preferred embodiment of the invention.

The rotor blades 16 are connected to the rotor hub 14 rotatably about the longitudinal axis thereof, by way of a flange connection 32. An adjusting motor 34 is mounted on the flange connection 32 and adjusts the rotor blade 16 by way of an adjusting transmission 36. The adjusting motor 34 and the adjusting transmission 36 are connected to the control device 8 by way of electrical connections 50 and 46 respectively which are shown in FIG. 3. The front housing 30 encloses the rotor hub 14 with the bearings 20, the flange connection 32, the adjusting motor 34 and the adjusting transmission 36, in weather-tight fashion. The front housing 30 is of a substantially hemispherical shape in cross-section.

Strain gauges 33 are disposed on the stub shaft 22. Strain gauges 40 are disposed on the rotor hub 14. The strain gauges 38 are connected to the control device 8 by way of an electrical connection 42. The strain gauges 40 are connected to the control device 8 by way of an electrical connection 48 which is shown in FIG. 3.

Figure 2:
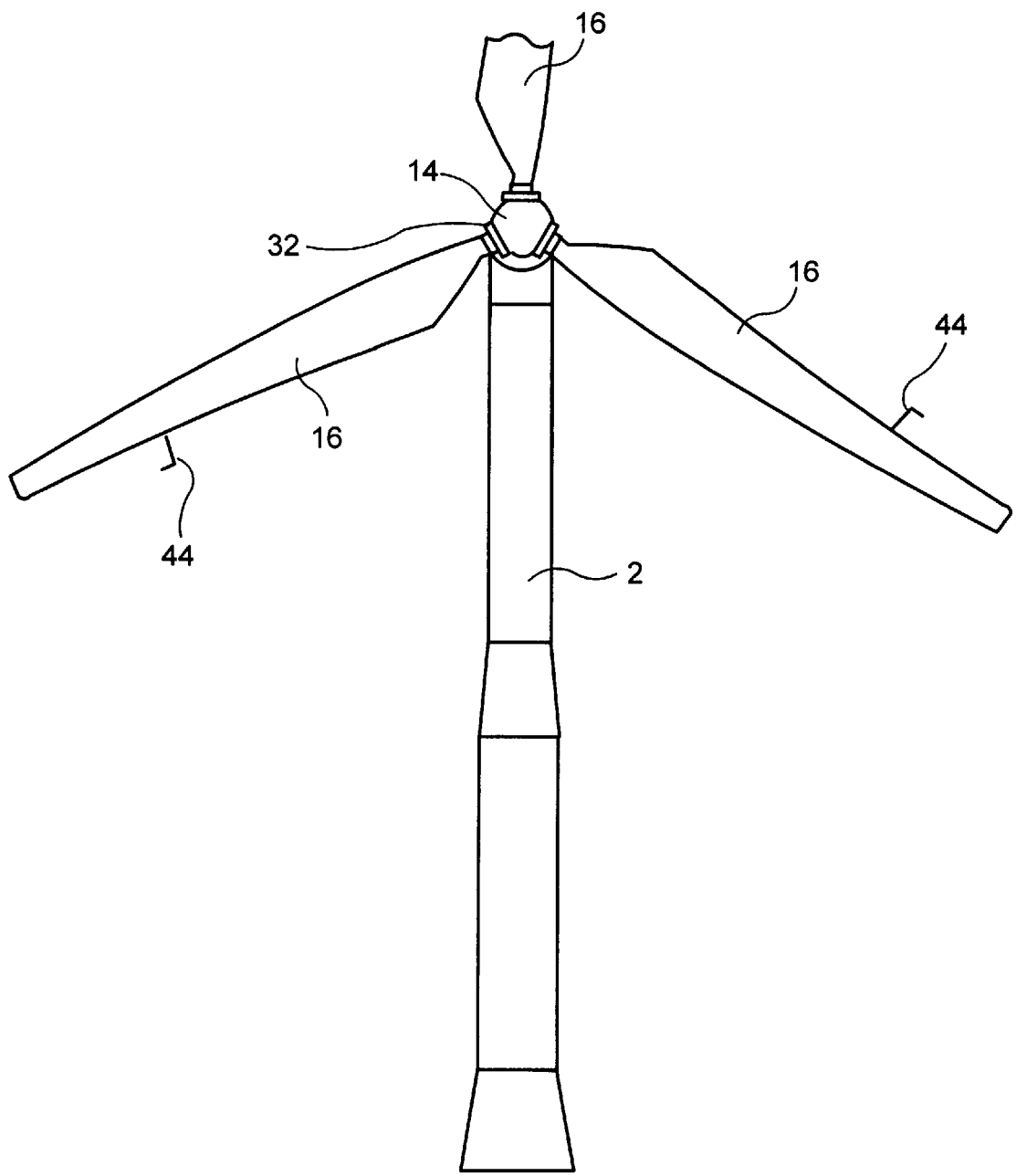
FIG. 2 is a front view of a wind power installation according to the invention.

FIG. 2 shows parts of the wind power installation 1 of FIG. 1, as viewed from the rotor side thereof. FIG. 2 shows the tower 2 with the rotor hub 14 mounted at its tip. Three rotor blades 16 extend in a star configuration from the rotor hub 14. The rotor blades 16 are connected to the rotor hub 14 by way of the flange connections 32. For the sake of clarity of the drawing, the front housing 30, the adjusting motor 34, the adjusting transmission 36, the stub shaft 22, the opening 24 and the closure portion 26 of FIG. 1 are not illustrated.

Mounted on the rotor blades 16 are wind vanes or indicators 44 for measuring the afflux angle of the wind which meets the rotor blades 16. The wind vanes 44 are connected to the control device 8 (FIG. 1) by way of the electrical connection 52 shown in FIG. 3.

Reference will now be made to the block circuit diagram of FIG. 3 to describe hereinafter the mode of operation of the wind power installation according to the invention.

During operation of the wind power installation 1 the rotor 18 rotates about the axis of the stub shaft 22. In that situation the rotor blades 16 are at a given angular position which is predetermined by means of the control device 8, the adjusting motor 34 and the adjusting transmission 36, relative to the plane in which the rotor blades 16 are rotating, namely the rotor plane. The instantaneous angle $\alpha_{instantaneous}$ of the rotor blades 16 relative to the rotor plane is communicated to the control device 8 by the adjusting transmission 36 as the actual value of the instantaneous position of the rotor blade 16, by way of an electrical connection 46. At the same time the control device 8 receives from the strain gauges 38 which are secured to the stub shaft 22, measurement values relating to the instantaneous loading of the stub shaft 22, by way of the connecting line 42 ('load signal stub shaft' in FIG. 3). Also simultaneously with the communication of the instantaneous adjusting angle of the rotor blades 16, the control device 8 receives from the strain gauges 10 on the rotor hub, by way of the line 48, measurement values relating to the current loading of the rotor hub 14 ('load signal hub' in FIG. 3). If, by means of the strain gauges 38, 40, the control device 8 detects a one-sided loading on the rotor, then, having regard to the instantaneous adjusting angle $\alpha_{instantaneous}$ of the rotor blades 16 and the instantaneous afflux angle $\beta$ detected by the wind vane 44, the control device 8 passes a signal $\alpha_{new}$ by way of the line 50 to the adjusting motor 34, to adjust the corresponding rotor blade 16 by the difference $\alpha_{new} - \alpha_{instantaneous}$.

By virtue of the fact that the control device 8 continuously receives the measurement values from the strain gauges 38 and 40 and virtually instantaneously, having regard to the afflux angle $\beta$ which is also communicated continuously to the control device 8 by way of the connecting line 52, outputs the working command to the adjusting motor 34 for setting a new angle of the rotor blades 16, adaptation of the position of the rotor blades 16 occurs on-line with a change in the load conditions in the region of the rotor, and thus there is on-line compensation for asymmetrical loadings on the rotor 18.

As an alternative to measurement of the instantaneous loading on the wind power installation by means of strain gauges on the rotor hub and the stub shaft, it is also possible to provide for loading measurement directly at the rotor blades by suitable strain gauges.

To conclude it should be noted that the various signals (that is to say 'load signal hub' 40, 'load signal stub shaft' 38, 'instantaneous angle $\alpha_{instantaneous}$' 46 and 'afflux angle $\beta$' 53) which are used to ascertain the ideal rotor blade angle can be used either jointly or also alternatively.

While the foregoing description and drawings represent the preferred embodiments of the present invention, it will be obvious to those skilled in the art that various changes and modifications may be made therein without departing from the true spirit and scope of the present invention.

What is claimed is:

1. A wind power installation comprises:
   a rotor with a rotor hub with at least two rotor blades which are rotatable about the longitudinal axis;
   an adjusting device for individually adjusting a rotor blade to a desired blade setting angle;
   a generator which is operatively connected to the rotor;
   said rotor hub is provided with measurement means for ascertaining at least one of the instantaneous mechanical loading of the hub or a rotor blade;
   control means for ascertaining a blade angle position which is wanted for the reduction in the instantaneous loading using a variation in the instantaneous blade angle position of at least one rotor blade and which suitably adjust the rotor blade to the desired blade angle position by the adjusting device asynchronously from the blade angle position of other rotor blades; and
   said adjusting device and said measuring means being connected to the control means.

2. The wind power installation according to claim 1, wherein the position of the rotor blade or the rotor blades is continuously adjusted to the instantaneous loading on the wind power installation.

3. The wind power installation according to claim 1, wherein the measuring means for ascertaining the loading on the rotor blade ascertain a wind speed which prevails at the rotor blade.

4. The wind power installation according to claim 3, wherein the measuring means for measuring the wind speed have an anemometer.

5. The wind power installation according to claim 4, wherein the anemometer is arranged on the rotor blade.

6. The wind power installation according to claim 1, wherein the measuring means ascertain a mechanical load which prevails in a portion of the rotor.

7. The wind power installation according to claim 1, wherein the measuring means ascertain a load which prevails in an adjustable portion of the rotor.

8. The wind power installation according to claim 1, wherein the measuring means ascertain a load which prevails in the adjustable rotor blade.

9. The wind power installation according to claim 1, having a rotor hub wherein the measuring means ascertain a load which prevails in the rotor hub.

10. The wind power installation according to claim 1, having a stub shaft for supporting the rotor wherein the measuring means ascertain a load which prevails in the stub shaft.

11. The wind power installation according to claim 1, having a drive shaft which connects the rotor and the generator directly or by way of a transmission wherein the measuring means ascertain a load which prevails in the drive shaft.

12. The wind power installation according to claim 6, wherein the measuring means for measuring the load have strain gauges.

13. The wind power installation according to claim 7, wherein the measuring means for measuring the load have stain gauges.

14. The wind power installation according to claim 8, wherein the measuring means for measuring the load have stain gauges.

15. The wind power installation according to claim 9, wherein the measuring means for measuring the load have stain gauges.

16. The wind power installation according to claim 10, wherein the measuring means for measuring the load have stain gauges.

17. The wind power installation according to claim 11, wherein the measuring means for measuring the load have stain gauges.

18. The wind power installation according to claim 1, wherein the measuring means ascertain an afflux angle of the wind, which prevails at the rotor blade to be adjusted.

19. The wind power installation according to claim 18, wherein the measuring means for measuring the afflux angle have a wind vane mounted on the rotor blade.

20. The wind power installation according to claim 1, having at least two rotor blades wherein at least one rotor blade is adjustable asynchronously with the other blade or blades.

21. The wind power installation according to claim 1, wherein at least a portion of at least one rotor blade is adjustable asynchronously with respect to at least one further adjustable portion of the same rotor blade or with respect to the other rotor blade or blades or portions thereof.

22. The wind power installation according to claim 1, wherein the position of the rotor blade or blades that is desired for a given instantaneous loading is preset by way of input means which are connected to the control means.

23. The wind power installation according to claim 1, wherein the adjusting device for adjusting the rotor blade has an adjusting motor and an adjusting transmission which is driven thereby, wherein the control means receive from the adjusting transmission an actual value in respect of the instantaneous position of the rotor blade and adjust the rotor blade by way of the adjusting motor.

24. The wind power installation according to claim 23, wherein the control means implement adjustment of the rotor blade virtually simultaneously with detection of the measurement values.

25. The wind power installation according to claim 1, wherein the wind power installation is of the horizontal axis type.

26. The wind power installation according to claim 1, wherein the rotor is a rotor on the windward side.

27. A process for the operation of the wind power installation according to claim 1, comprising the steps of:
   ascertaining the instantaneous installation mechanical loading of a portion of the wind power installation by measuring means arranged in the rotor hub;
   ascertaining a blade angle position which is wanted for the reduction in the instantaneous loading or a variation in the instantaneous blade angle position of at least one rotor blade by control means; and
   to reduce the instantaneous loading, setting the corresponding rotor blade to the desired blade angle asynchronously in relation to the other rotor blade or the other rotor blades.

* * * * *